United States Patent [19]

Martin

[11] 4,051,415
[45] Sept. 27, 1977

[54] WEB SPEED CONTROL SYSTEM

[75] Inventor: Peter G. Martin, Arlington, Mass.

[73] Assignee: Braemar Computer Devices, Inc., Burnsville, Minn.

[21] Appl. No.: 555,358

[22] Filed: Mar. 5, 1975

[51] Int. Cl.² ............................................ H02P 5/50
[52] U.S. Cl. ...................................... 318/7; 318/72; 318/77
[58] Field of Search .................. 318/7, 71, 72, 68–70, 318/77

[56] References Cited

U.S. PATENT DOCUMENTS

| | | | |
|---|---|---|---|
| 3,351,831 | 11/1967 | Hemphill et al. | 318/77 |
| 3,549,948 | 12/1970 | Jaeschke | 318/72 |
| 3,644,806 | 2/1972 | Belson | 318/7 |
| 3,673,473 | 6/1972 | Werner | 318/7 |
| 3,728,596 | 4/1973 | Hermansson et al. | 318/71 |
| 3,805,131 | 4/1974 | Kappius | 318/77 |
| 3,910,527 | 10/1975 | Buhler | 318/7 X |
| 3,913,866 | 10/1975 | Hankins | 318/7 X |

Primary Examiner—B. Dobeck
Attorney, Agent, or Firm—Weingarten, Maxham & Schurgin

[57] ABSTRACT

A motor control system for use in maintaining substantially constant linear speed of a web moving between a supply and a takeup reel such as in a reel driven magnetic tape transport. The rotational periods of the reels are measured to provide representative signals which are summed and compared with a reference to yield an error signal for control of takeup reel motor driving voltage such that the error voltage tends to become zero, resulting in substantially constant linear web speed. In alternative embodiment, the period representative signals are each non-linearly processed prior to summing to enhance the accuracy of web speed control. In further embodiment, the rotational frequencies of the web reels are measured to provide representative signals which are each non-linearly processed and then summed and from which summed signal is derived a resulting error voltage for web speed control.

19 Claims, 7 Drawing Figures

WEB SPEED CONTROL SYSTEM

FIELD OF THE INVENTION

This invention relates to motor speed control systems and more particularly to systems for maintaining a constant linear speed of a web being moved between a supply and a takeup reel.

BACKGROUND OF THE INVENTION

Systems are known for the control of the linear speed of a web moving between a supply and a takeup reel where the rotational velocities of the reels are continuously changing during web motion due to the respectively increasing and decreasing radii of web material on the two reels. Such systems are employed, for example, in magnetic tape cassette transports for digital data recording and retrieval and of the type in which the tape reels are directly driven and in which a capstan drive is not employed to maintain linear tape speed. According to one known control technique, clock information is prerecorded along a timing track on the magnetic tape and during transport operation this information is read from the tape and employed in a servo-control loop to maintain constant tape speed. The presence of a clock track on the tape materially detracts from the data storage capacity of the tape and requires prerecording of the tape.

According to another known speed control technique, the equation of motion is solved to derive an error signal for controlling the takeup motor speed in order to yield a constant linear tape speed. The tape or web speed in terms of the supply and takeup reel velocities is defined as follows:

$$s = \frac{4\pi^2 f_A f_B \sqrt{R_E^2 + R_F^2}}{\sqrt{f_A^2 + f_B^2}}$$

where $s$ is linear tape speed (centimeters per second), $f_A$ and $f_B$ are the respective reel rotation frequencies (revolutions per second) and $R_E$ and $R_F$ are the respective empty and full reel radii (centimeters). This equation must be met if absolute web speed control is to be achieved. Systems in which the foregoing equation is electronically implemented either directly or indirectly to provide speed control are shown, for example, in U.S. Pat. Nos. 2,837,705, 3,806,061, 2,469,706, 2,949,249 and 3,733,529. In each of the systems of the above-identified patents the speed of both the supply and takeup reels is measured to provide signals which are processed in a manner to effectively satisfy the above equation to provide a control signal to a drive motor to maintain constant linear web speed. The circuit implementations required to effectively implement this equation tend to be needlessly complex and expensive since the theoretical degree of control cannot be realized in practical engineering embodiment.

Another speed control technique is the subject of the United States Pat. No. 3,704,401, in which signals representing the speeds of the two reels are summed and the summed signal compared with a reference signal to provide an error signal for motor control. Although relatively simple in implementation, this technique exhibits a significant error of about ±6% for a 150 foot tape, and ±14% for a 300 foot tape in a standard Philips-type cassette.

SUMMARY OF THE INVENTION

Briefly, the invention provides a motor control system especially suited to reel driven magnetic tape transports for use in digital data systems and wherein linear tape speed is maintained constant within acceptable engineering limits by measuring the rotational period of each reel, providing the sum of the reel periods and deriving an error signal therefrom for control of takeup motor driving voltage. For standard tape capacities of 150 feet and 300 feet, such as in the widely employed Philips-type cassette, linear tape speed can be maintained at ±1.7% or ±3.4% respectively, which is wholly acceptable for data recording and retrieval purposes.

The speed of the supply and takeup reels is measured by associated tachometers which provide respective output signals to associated period measuring circuits which, in turn, respectively provide signals representative of the periods of rotation of the two reels. The sum of these period representative signals is compared with a reference signal to yield an error signal for control of the takeup reel motor driving voltage. The takeup reel motor is driven such that the error voltage tends to become zero, resulting in a linear tape speed which is substantially constant. The accuracy of tape speed control can be materially enhanced according to an alternative embodiment of the invention wherein the period representative signals are each non-linearly processed, such as by clipping in amplitude to a selected level, the nonlinearly processed signals then being summed for processing as described above to produce an error signal for motor control.

According to another alternative embodiment of the invention, the rotational frequency of the supply and takeup reels is measured to provide frequency representative signals which are each non-linearly processed and then summed for comparison with a reference signal and from which comparison an error signal is derived for control of takeup motor drive. Speed control can be typically maintained by use of this embodiment within ±1.5% for a 150 foot tape length and ±1.8% for a 300 foot tape length of Philips-type cassettes.

DESCRIPTION OF THE DRAWINGS

The invention will be more fully understood from the following detailed description taken in conjunction with the accompanying drawings, in which.

DETAILED DESCRIPTION OF THE INVENTION

The invention will be described for use in a digital magnetic tape transport employing a Philips-type cassette for the magnetic recording and playback of data. It will be appreciated, however, that the invention is not limited to use in a magnetic tape transport but rather is more broadly useful in a variety of systems in which it is desirable to control the linear speed of a web moving between a supply and a takeup reel.

Figure 1:
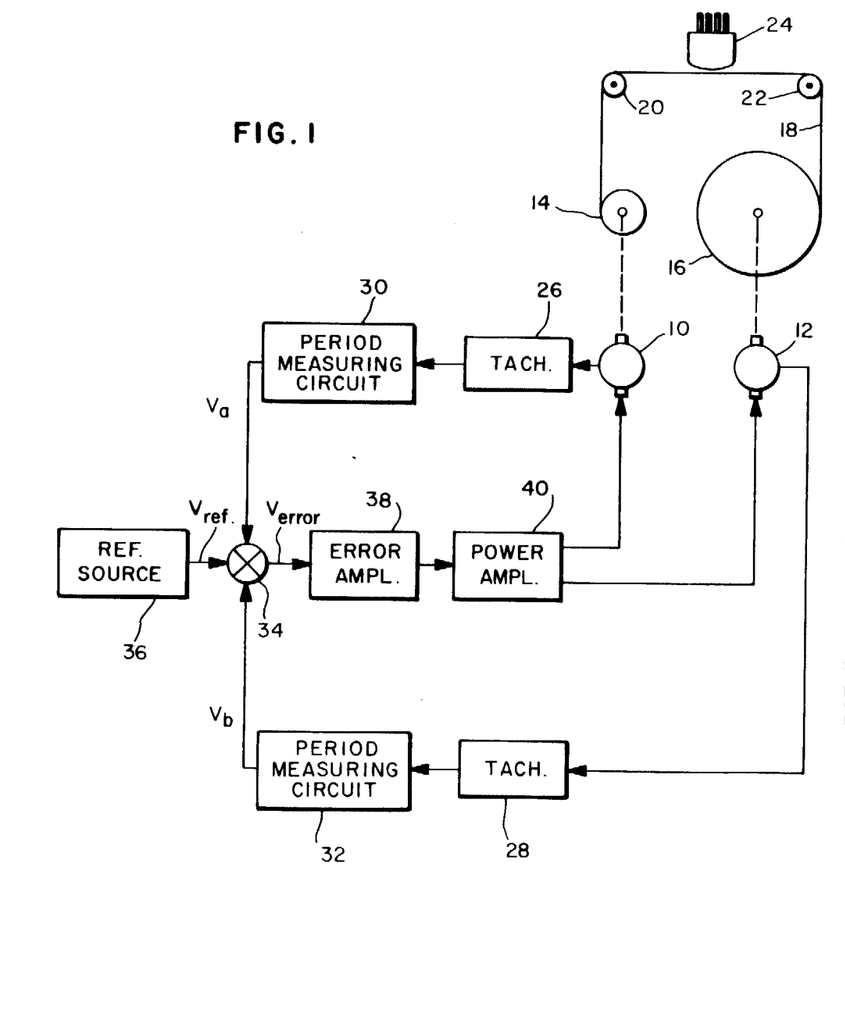
FIG. 1 is a diagrammatic representation of a preferred embodiment of the invention.

A preferred embodiment of the invention is shown in diagrammatic form in FIG. 1 for use in providing a substantially constant linear tape speed in a reel driven magnetic tape transport. First and second motors 10 and 12 are coupled to respective reels 14 and 16 containing a supply of magnetic tape 18 which is disposed between the reels in a predetermined path defined by idler rollers 20 and 22. A magnetic read/write head 24 is disposed adjacent the magnetic surface of tape 18 and operative in conjunction with associated circuitry for the reading of data therefrom or the entry of data thereon. According to the invention, the linear tape speed past head 24 is maintained substantially constant to permit proper digital storage and retrieval and without the use of a capstan drive for maintaining speed control of the tape. The shaft of each motor 10 and 12 is coupled to a respective tachometer 26 and 28 each operative to provide an output signal representative of the rotational velocity of the corresponding motor shaft. These tachometer signals are applied to respective period measuring circuits 30 and 32 which provide respective output signals $V_a$ and $V_b$ representative of the period of rotation of the corresponding motor shafts. The reels 14 and 16 are directly driven by respective motors 10 and 12 and thus the velocities are the same as the motor velocities.

The signals $V_a$ and $V_b$ are applied to a summing circuit 34 which also receives a reference signal $V_{ref}$ from a reference source 36. The summing circuit provides an error signal $V_{error}$ equal to the difference between the reference signal and the sum of the period representative signals. Thus, the error signal can be expressed as follows:

$$V_{error} = V_{ref} - (V_a + V_b)$$

The error signal is applied to an error amplifier 38, the output of which is applied to a power amplifier 40 which, in turn, produces driving signals for motors 10 and 12. The error amplifier 38 provides an amplified error signal for the purpose of increasing or decreasing the applied motor voltages, and also typically includes frequency compensation circuits to define the response time, accuracy and stability of the overall control loop for the reel motors. The power amplifier 40 amplifies the error signal to apply signals of appropriate control levels to the corresponding motors 10 and 12.

The tachometers 26 and 28 are of well known construction; typically, each include a photoelectric chopper including a disc affixed to and rotatable with the motor shaft and having a plurality of light transmissive segments radially disposed thereon and having an illumination source on one side of the disc and a light sensor on the opposite side of the disc to receive chopped light as the disc rotates. As the chopper disc rotates, light pulses produced cause production of corresponding electrical pulses by the light sensor and which are applied to the period measuring circuit.

In actual implementation of a magnetic tape transport embodying the invention for digital data recording and reproduction purposes, additional control features are usually present. For example, in addition to the controlled tape speed for recording and playback of data, the tape can be driven at a higher velocity employed during a search mode in seeking predetermined data recorded on tape. The tape can also be driven bidirectionally such that either reel motor can function as the controlled takeup motor for a given direction of tape motion. The tape transport also typically includes cassette size switch logic to achieve intended controlled tape speed irrespective of cassette size. These features can be implemented in well known manner and need not be described in detail for an understanding of this invention.

Figure 2:
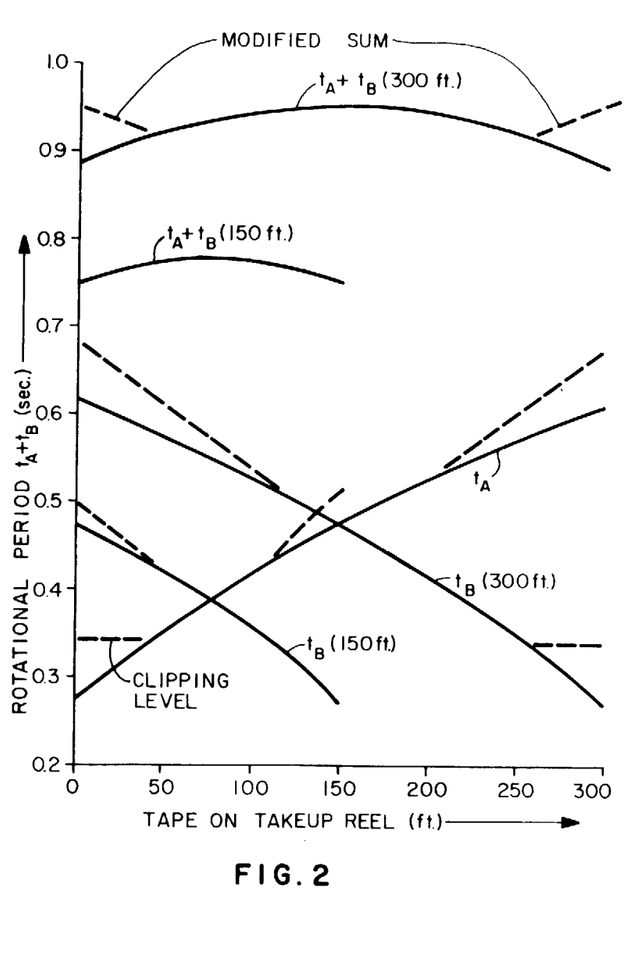
FIG. 2 is a plot of rotational period versus reel capacity useful in illustrating operation of the invention.

Referring to FIG. 2, there is shown a plot of the rotational periods of the tape reels ($t_A$ and $t_B$) in relation to the amount of tape on the takeup reel. The illustrated plot is for Philips-type cassettes of 150 foot and 300 foot capacity with a nominal tape speed of 10 inches per second. It is seen that for both illustrated tape capacities, the period of rotation of the takeup reel ($t_B$) decreases in a fairly linear manner, while the rotational period of the supply reel ($t_A$) correspondingly increases. The sum of the rotational periods ($t_A + t_B$) is approximately constant with an error of ±1.7% for a 150 foot tape and ±3.4% for a 300 foot tape. According to the invention, the linear tape speed is sufficiently constant for most digital tape transport purposes, as digital encoding and decoding techniques in practical use are tolerant of speed errors from all causes of at least ±20%.

Figure 3:
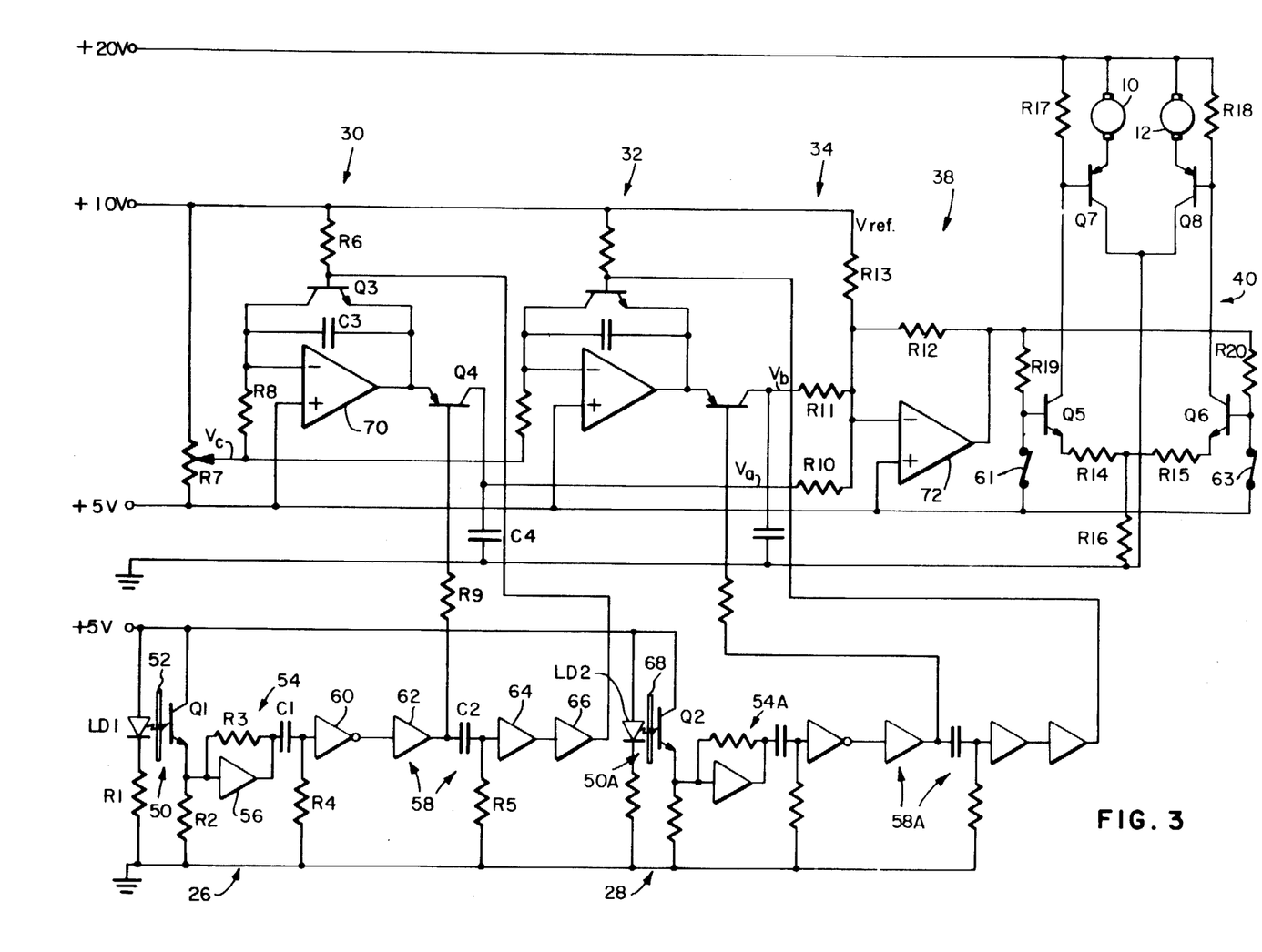
FIG. 3 is a schematic diagram of the embodiment of FIG. 1.

A schematic diagram of the embodiment of FIG. 1 is shown in FIG. 3. Tachometer 26 comprises a photoelectric chopper 50 associated with motor 10 and having a chopper disc 52 affixed to and rotatable with the shaft of motor 10 and interposed between a light-emitting diode LD1 and a phototransistor Q1. The light-emitting diode LD1 is connected in series with a current limiting resistor R1 between ground and a source of positive potential, typically +5 volts. The phototransistor Q1 has its collector connected to the positive voltage source and its emitter connected via a resistor R2 to ground and to the input of a Schmitt trigger circuit 54 which includes a non-inverting buffer 56 having a feedback resistor R3 coupling the output and input thereof. The output of the Schmitt trigger is coupled via a capacitor C1 and a shunt resistor R4 to a pulse generator circuit 58 which includes an inverter 60 and a non-inverting buffer 62 in cascaded interconnection and operative at the output of buffer 62 to provide negative pulses. The output of buffer 62 is also coupled via a series capacitor C2 and shunt resistor R5 to a cascaded pair of non-inverting buffers 64 and 66 which provide positive pulses at the output of buffer 66. The cascaded buffer arrangement provides improved squaring of the received pulses. The output pulses from buffers 62 and 66 are employed to control an integrator circuit to be presently described and which is part of period measuring circuit 30.

A second photoelectric chopper 50A includes a chopper disc 68 affixed to and rotatable with the shaft of motor 12 and interposed between a light emitting diode LD2 and a phototransistor Q2. This chopper is identical to chopper 50 and is operative to provide pulses representative of shaft velocity to a Schmitt trigger 54A which, in turn, provides output pulses to a pulse generator 58A. Circuits 54A and 58A are the same in construction and operation as corresponding circuits 54 and 58 described above.

Each of the period measuring circuits 30 and 32 includes an integrator and sample and hold circuit. The circuitry of period measuring circuit 30 will be described in detail, it being understood that circuit 32 is constructed and operative in identical manner. The integrator includes an operational amplifier 70 having a capacitor C3 coupled between the output and the negative input thereof, and a transistor Q3 also in feedback coupling relationship between the output and negative input of amplifier 70. The base of transistor Q3 is coupled via a resistor R6 to a source of positive potential, typically +10 volts, and the base of transistor Q3 is also coupled to the output of buffer 66 for receiving positive pulses therefrom. The positive input of amplifier 70 is coupled to a +5 volt or other suitable source. A potentiometer R7 is connected between the +5 volt and +10 volt sources to provide a manually adjustable speed control, the adjustable tap of potentiometer R7 being connected to the negative input of amplifier 70 by way of a resistor R8. The output of amplifier 70 is coupled to the emitter of a transistor Q4, the collector of which is coupled via capacitor C4 to ground and to an input of a summing network to be described hereinbelow. The base of transistor Q4 is coupled via a resistor R9 to the output of buffer 62 for receipt of negative pulses therefrom. It is noted that with the operating voltages of the circuit of FIG. 3, no negative power supplies need be used.

A control voltage $V_c$, derived from the adjustable tap of potentiometer R7 in accordance with a selected tape speed, is applied to operational amplifier 70 which generates at the output thereof a downward voltage ramp from the ±5 volt level. During a sampling interval determined by the width of the pulse applied from buffer 62 to the base of transistor Q4, capacitor C4 is charged and the voltage across this capacitor provides an output proportional to the period of the pulses received from buffer 62. A reset pulse is provided after the sampling interval by buffer 66 to the base of transistor Q3 to discharge the integrator ramp voltage. Each time a light pulse from chopper wheel 52 is sensed, causing the production by transistor Q1 of a corresponding electrical pulse, the integrator ramp voltage is sampled by gating transistor Q4, the sampled voltage being stored in capacitor C4 for application to a summing circuit, to be described. The integrator output voltage $V_a$ provided at the collector of transistor Q4 is equal to the product of the control voltage $V_c$ derived from potentiometer R7 multiplied by the time period being measured divided by the RC time constant of the integrator circuit. The integrator 32 operates identically and provides at the output thereof a voltage $V_b$ to the summing network.

Operational amplifier 72 and its associated components function as error amplifier 38. The output voltages $V_a$ and $V_b$ from integrators 30 and 32 are applied to respective resistors R10 and R11 of summing network 34 and which are interconnected and coupled to the negative input of amplifier 72. Resistor R13 is coupled from the common connection of R10 and R11 to the ±10 volt source, while a feedback resistor R12 is coupled between the output and the negative input of amplifier 72. The positive input of amplifier 72 is connected to the +5 volt source. The negative input of amplifier 72 provides a virtual ground summing point for the voltages $V_a$ and $V_b$ and the reference voltage across resistor R13. This summing point is maintained at zero voltage by the closed loop operation of the servo control loop. In the illustrated embodiment, the voltages $V_a$ and $V_b$ are negative, while the reference voltage is positive. The error signal $V_{error}$ provided by amplifier 72 is derived by adding the negative voltages $V_a$ and $V_b$ with the positive reference voltage to effectively subtract the sum of the voltages $V_a$ and $V_b$ from the reference voltage.

The output of operational amplifier 72 is an amplified error signal which is applied via a resistor R19 to the base of transistor Q5, and via resistor R20 to the base of transistor Q6 of power amplifier 40. The transistors Q5 and Q6 are interconnected in differential circuit configuration, with resistors R14 and R15 in series interconnection between the emitter electrodes of transistor Q5 and Q6 and with a resistor R16 coupled between the junctions of resistors R14 and R15 and ground. The collectors of transistors Q5 and Q6 are coupled to the respective base electrodes of transistors Q7 and Q8 which are in emitter follower circuit configuration. The collectors of transistors Q7 and Q8 are commonly connected to ground. Resistors R17 and R18 are connected from the +20 volt source to the respective bases of transistors Q7 and Q8. A switch 61 is connected between the base of Q5 and the +5 volt source, while a switch 63 is connected from this source to the base of transistor Q6. The switches 61 and 63 are preferably solid state switches operative in accordance with an applied switching signal, but for simplicity, are illustrated schematically in mechanical form. Transistors Q7 and Q8 function as emitter followers and provide a low impedance voltage source for motor drive.

Power is applied by the differential circuit comprising power amplifier 40 to both motors 10 and 12, the power being applied in opposing sense, such that the tape between the associated reels is always under controlled tension. Tape motion in a given direction is achieved by increasing the voltage applied to the takeup motor and decreasing that applied to the supply motor. In the circuit of FIG. 3, with switches 61 and 63 both closed, the same voltage is applied in opposite sense to both motors 10 and 12 and no tape motion results. Upon opening of switch 61, the error voltage from amplifier 72 is applied to transistor Q5 which, in turn, causes application of driving voltage to motor 10 which functions as the takeup motor. A lesser voltage is applied by transistors Q6 and Q8 to motor 12 to maintain tape tension. Similarly, opening of switch 63 (with switch 61 closed) permits application of the error voltage to transistor Q6 for driving of motor 12 which in this instance functions as the takeup motor. A voltage lower than the driving voltage for motor 12 is now applied via transistors Q5 and Q7 to motor 10 to maintain tape tension. The tape can thus be driven bidirectionally with the linear speed being maintained substantially constant for either driving direction.

According to an alternative embodiment of the invention, constant linear tape speed can be maintained within a closer tolerance by the non-linear processing of each period representative signal derived from the respective reels. As shown in FIG. 2, the signals representative of rotational period $t_A$ and $t_B$ are each non-linearly processed such that the sum of these processed signals is constant within a predetermined error range.

Figure 4:
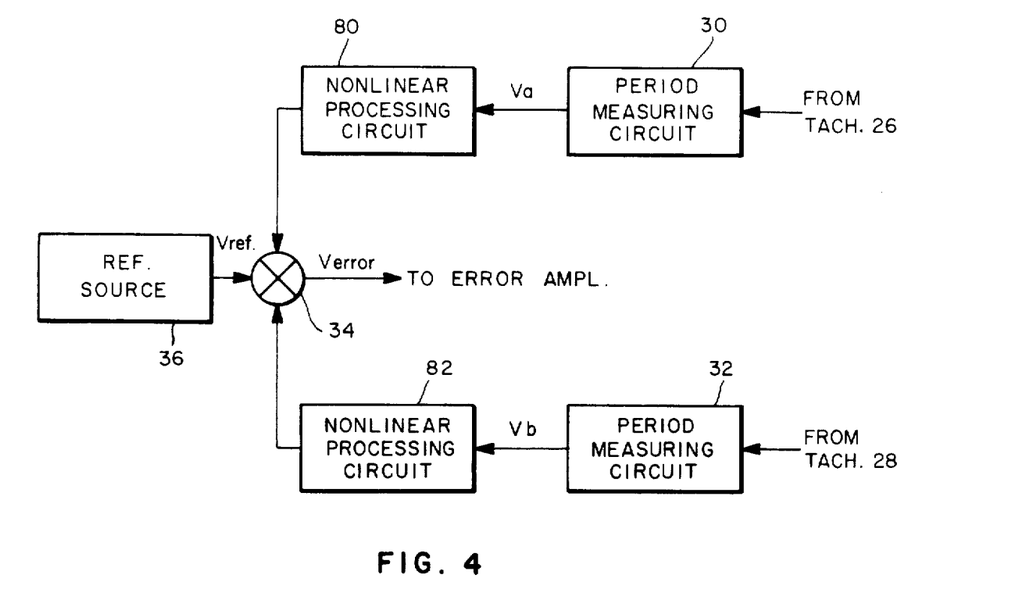
FIG. 4 is a diagrammatic representation of an alternative embodiment of the invention.

This alternative embodiment is shown in FIG. 4 which is seen to be similar to the embodiment of FIG. 1 with the addition of first and second non-linear processing circuits 80 and 82 which receive respective signals $V_a$ and $V_b$ and provide non-linear versions thereof to summing circuit 34. The signals $V_a$ and $V_b$ are processed such that the represented rotational periods of the corresponding reels cannot be below a predetermined value. The non-linear processing circuits 80 and 82 can be, for example, clipping circuits which limit the amplitude of the corresponding signals $V_a$ and $V_b$. In the embodiment represented by the graph of FIG. 2, signals representing rotational periods less than 0.34 seconds are clipped as shown by the dotted clipping level, resulting in a sum $t_A + t_B$ which is constant within an intended tolerance and exhibits a residual speed error approximately half that of the embodiment of FIG. 1. The clipping circuits are themselves well known in the art, typical ones being shown in *Operational Amplifiers: Design and Applications*, McGraw-Hill, 1971, page 237 et seq.

Figure 5:
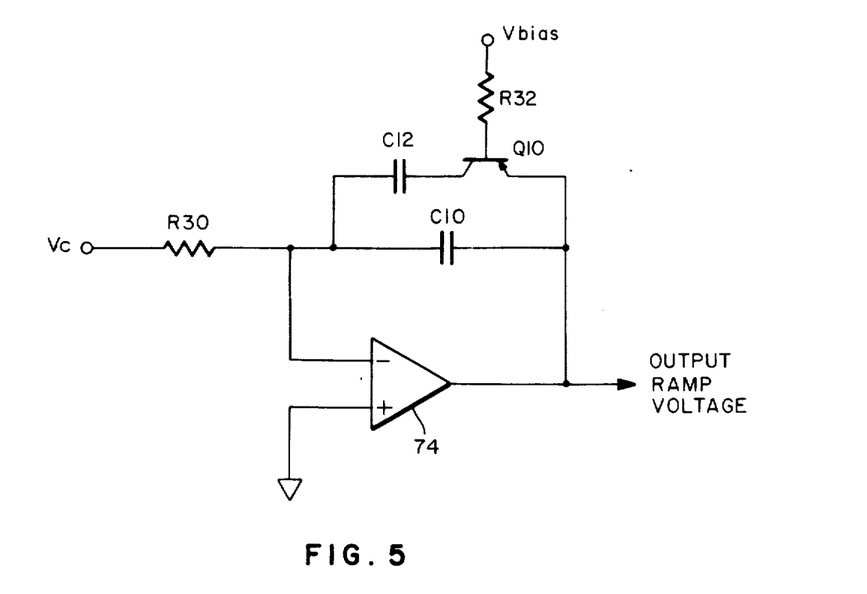
FIG. 5 is a schematic diagram of a non-linear processing circuit useful in the invention.

Non-linear processing circuits 80 and 82 can also be implemented by a dual slope integrator as shown in FIG. 5 which effectively modifies the signals representative of rotational period to yield a sum of the modified signals which is substantially constant. Referring to FIG. 5, the control voltage $V_c$ is applied via a resistor R30 to the negative input of the operational amplifier 74, the positive input of which is coupled to an appropriate reference source such as ground. A capacitor C10 is coupled between the output and the negative input of amplifier 74. A capacitor C12 is coupled from the negative input of amplifier 74 to the collector of a transistor Q10, the emitter being connected to the output of amplifier 74. The base of transistor Q10 is coupled via a resistor R32 to a source of negative bias voltage $V_{bias}$.

In operation, transistor Q10 is conductive and negative ramp voltage is provided as an output from amplifier 74 having a slope determined by $V_a/R(C10 + C12)$. When the ramp voltage is below a selected level, determined by the difference between $V_{bias}$ and the base-emitter voltage drop of transistor Q10, transistor Q10 becomes non-conductive and a ramp voltage of greater slope is provided as defined by $V_a/RC10$. By this varying slope integrated signal, the period representative signals are modified, as illustrated in FIG. 2, in a manner to produce a sum $t_A + t_B$ which is constant within an intended degree of tolerance. It will be appreciated that still other forms of non-linear processing of the period representative signals can be accomplished to produce the substantially constant sum of the modified signals.

Figure 7:
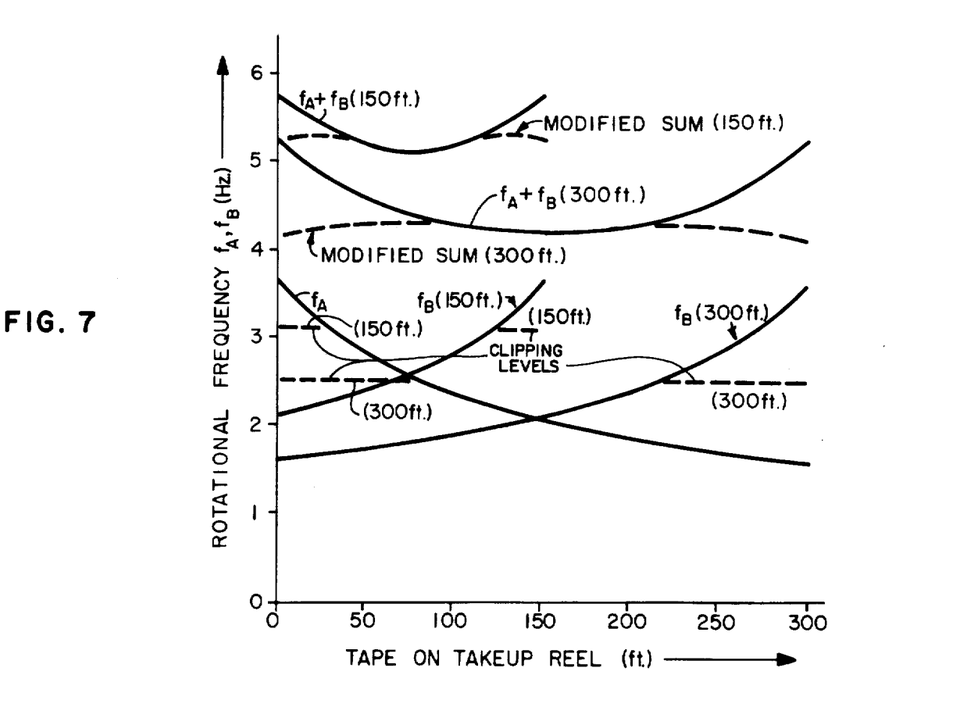
FIG. 7 is a plot of rotational frequency versus reel capacity useful in illustrating operation of the embodiment of FIG. 6.

According to a further alternative embodiment, the frequency of rotation of the reel motors 10 and 12 is measured rather than the rotational periods thereof and from which frequency measurements an error signal is derived to drive the reel motors to maintain approximately constant linear tape speed. The rotational frequencies or velocities of the tape reels are depicted in the graph of FIG. 7 for both a 150 foot tape cassette and a 300 foot tape cassette. This graph also shows a plot of the sum of the motor rotational frequencies $f_a$ and $f_b$ for both cassette sizes. It will be appreciated that the graph of FIG. 7 is the reciprocal of the graph of FIG. 2 as frequency and period measurements are interrelated by a reciprocal relationship. According to this embodiment of the invention, the signals representing the rotational frequencies of the reel motors are non-linearly processed to yield a sum of the process signals which is approximately constant within a practical degree of error.

Figure 6:
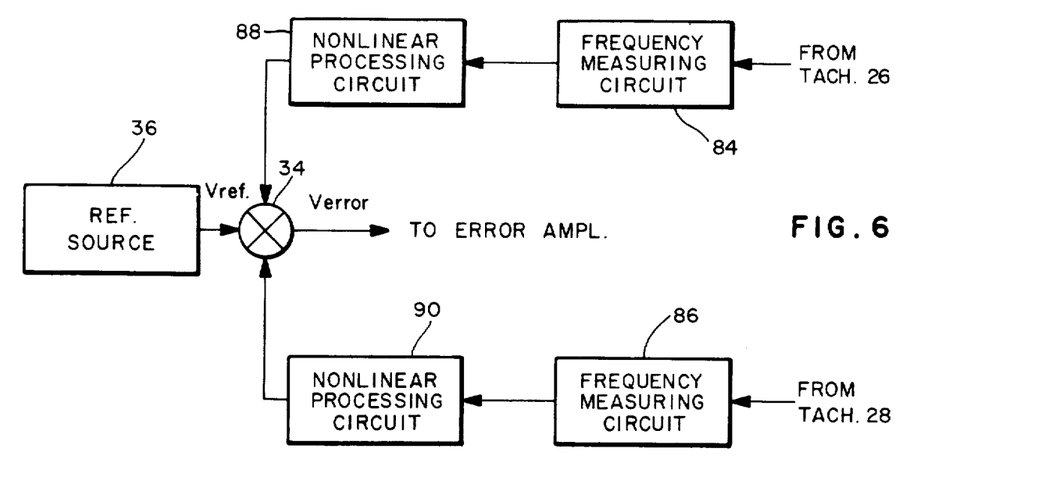
FIG. 6 is a diagrammatic representation of a further embodiment of the invention.

As in the embodiment of FIG. 4, the non-linear processing can take the form of clipping of the signals at the selected level. Referring to FIG. 7, clipping levels representative of rotational frequencies of 3.1 Hz and 2.5 Hz, for 150 foot and 300 foot tape lengths respectively are shown in dotted form. For the illustrated clipping levels, the sum of the clipped frequency indicative signals provides tape speed control of ±1.5% and ±1.8% respectively for 150 foot and 300 foot tape lengths. This embodiment of the invention employing the rotational frequency of each reel is shown in FIG. 6 and is similar in implementation to that of FIG. 4. However, the tachometer output signals are applied to respective frequency measuring circuits 84 and 86, the respective outputs of which are applied to respective non-linear processing circuits 88 and 90 which, in this embodiment described, are clipping circuits. Preferably, the tachometers 26 and 28 provide signals denoting rotational frequency rather than period to facilitate the provision by circuits 84 and 86 of frequency representative signals. For example, a motor tachometer provides a useful frequency sensitive output signal. The output signals from circuits 88 and 90 represent the rotational frequency of the respective tape reels clipped to a predetermined level and are applied to summing circuit 34 which receives a reference signal from reference source 36. An error signal is provided by summing circuit 34 for application via error amplifier 38 and power amplifier 40 to reel motors 10 and 12 for control of linear tape speed.

The clipping level is determined such that the sum of the clipped frequency representative signals ($f_A$ and $f_B$) at the ends of the tape is equal to the sum of the unmodified frequency representative signals at the middle of the tape. The clipping level is a function of the particular length of tape employed, but the ratio of the clipping level to the sum of the unmodified frequency representative signals is essentially independent of tape length. As a result, the clipping voltage in actual implementation can be a fixed proportion of the control voltage which defines the linear tape speed. Thus, in a tape transport operative with different cassette capacities, typically 150 and 300 feet, selection of a particular capacity determines the associated control voltage and for which the corresponding clipping voltage can be automatically corrected. In the plot of FIG. 7, the clipping level is 60% of the sum $f_A + f_B$ at the middle of the tape and provides intended speed control within the tolerance shown. The non-linear processing circuits 88 and 90 can also be other than clipping. Such circuits can be similar to that in FIG. 5 wherein a dual slope integrated signal is produced to modify the frequency representative signals such that the sum of the modified signals is substantially constant. Further alternative circuits can be employed, as discussed above in connection with FIG. 4, to provide intended non-linear processing of each frequency representative signal.

It will be appreciated that the invention can be employed in many different systems in which the linear speed of a web moving between a supply and a takeup reel is to be controlled. Such systems may employ a drive motor for each reel as in the above embodiments, or a single motor for the takeup reel such as in a unidirectional winding apparatus. The particular constituents of a system embodying the invention will, of course, be as required to suit intended system operation. Thus, the invention is not to be limited by what has been particularly shown and described as various modifications and alternative implementations will occur to those versed in the art without departing from the true scope of the invention.

What is claimed is:

1. For use in a reel driven web transport system including a supply reel, a takeup reel, a drive motor coupled to said takeup reel, a control circuit for maintaining substantially constant linear web speed of a web moving between said reels, said control circuit comprising:

first means for determining a rotational characteristic of said supply reel and providing a first signal representative thereof;

second means for determining a rotational characteristic of said takeup reel and providing a second signal representative thereof;

first and second non-linear processing means respectively operative in response to said first and second signals to provide respective non-linear signal representations of said rotational characteristics;

means for summing said non-linear signal representations;

means for providing an error signal from said summed signal; and means operative in response to said error signal to provide a control signal to said drive motor to govern its speed of rotation and produce substantially constant linear web speed.

2. The invention according to claim 1 wherein said first and second non-linear processing means each includes a clipping circuit operative to clip at a predetermined level the amplitude of said signal applied thereto and provide an output signal representative thereof such that the sum of said output signals is substantially constant within a predetermined range at said substantially constant linear web speed.

3. The invention according to claim 1 wherein said first and second means each comprises:

means for providing a corresponding one of said first and second signals representative of the rotational period of the respective reel.

4. The invention according to claim 1 wherein said first and second means each comprises;

means for providing a corresponding one of said first and second signals representative of the rotational frequency of the respective reel.

5. The invention according to claim 1 wherein said non-linear processing means each includes a non-linear circuit operative to modify said applied signal such that the sum of the modified signals is substantially constant within a predetermined tolerance range at said substantially constant linear web speed.

6. The invention according to claim 5 wherein each of said non-linear circuits includes a dual slope integrator providing a first slope at predetermined higher levels of a corresponding one of said signals applied thereto and a second slope in response to predetermined lower levels thereof.

7. The invention according to claim 1 including a drive motor coupled to said supply reel;

and wherein said control signal providing means includes means operative to drive said supply reel motor to provide controlled tension of said web moving between said supply reel and said takeup reel.

8. For use in a reel driven web transport system including a supply reel, a takeup reel, a pair of drive motors each coupled to a respective reel, a control circuit for maintaining substantially constant linear web speed of a web moving between said reels, said control circuit comprising:

first tachometer means coupled to said supply reel and operative to provide a first signal representative of the rotational speed thereof;

second tachometer means coupled to said takeup reel and operative to provide the second signal representative of the rotational speed thereof;

a first circuit operative in response to said first signal to provide a third signal representative of the period of rotation of said supply reel;

a second circuit operative in response to said second signal to provide a fourth signal representative of the period of rotation of said takeup reel;

means for providing a reference signal;

means for comparing the sum of said third and fourth signals and said reference signal to provide an error signal indicative of the difference between said reference signal and said summed signal; and output circuit means operative in response to said error signal to provide a controlled driving signal to said takeup reel drive motor to provide substantially constant linear web speed.

9. The invention according to claim 8 wherein said web can be driven in either a forward or a reverse direction between said reels, and wherein said output circuit means is operative to provide said controlled driving signal to the drive motor of the reel serving as the takeup reel for a selected direction of web motion.

10. The invention according to claim 9 wherein said output circuit means includes an error amplifier operative to provide an amplified error signal; and a power amplifier operative in response to said amplified error signal to provide said controlled driving signal to said takeup reel drive motor.

11. The invention according to claim 8 including first and second non-linear processing means respectively operative in response to said third and fourth signals to provide respective non-linear signal representations thereof.

12. The invention according to claim 9 wherein said output circuit means includes switching means operative to provide said controlled driving signal to the drive motor of the reel serving as the takeup reel for a selected direction of web motion, and providing a driving signal to the drive motor of the reel serving as the supply reel to thereby provide controlled tension of said web moving between said supply reel and said takeup reel.

13. The invention according to claim 12 wherein said first and second tachometer means each includes a photoelectric chopper providing electrical pulses representative of the rotational speed of the associated reel.

14. The invention according to claim 13 wherein said first circuit and said second circuit each include an integrator circuit operative to provide an output ramp signal; and a sample and hold circuit operative during a sampling interval defined by a pulse signal from said photoelectric chopper to store a representation of the magnitude of said output ramp signal and representative of the period of rotation of the corresponding reel.

15. For use in a reel driven web transport system including a supply reel, a takeup reel, a drive motor coupled to said takeup reel and a web movable from said supply reel to said takeup reel, a method for providing substantially constant linear web speed comprising the steps of:
- providing first and second signal indications of a rotational characteristic of said respective reels;
- non-linearly processing the respective signal indications of said rotational characteristics to provide respective modified signal indications thereof;
- providing a signal indication of the sum of said modified signal indications;
- deriving an error signal from said signal indication of said sum;
- providing a control signal in response to said error signal; and
- applying said control signal to said drive motor to cause movement of said web at a substantially constant linear speed.

16. The method according to claim 15 wherein said non-linearprocessing includes clipping at a predetermined level the respective signal indications of said rotational characteristics of each of said reels.

17. The method according to claim 15 wherein said first-named step comprises providing first and second signal indications of the period of rotation of each of said reels.

18. The method according to claim 15 wherein said first-named step comprises providing first and second signal indications of the rotational frequency of each of said reels.

19. For use in a reel driven web transport system including a supply reel, a takeup reel, a drive motor coupled to said takeup reel and a web movable from said supply reel to said takeup reel, a method for providing substantially constant linear web speed comprising the steps of:
- providing first and second signal indications of the period of rotation of said respective reels;
- providing a signal indication of the sum of said first and second signal indications;
- deriving an error signal from said signal indication of said sum; and
- providing in response to said error signal a control signal for application to said drive motor to cause movement of said web at a substantiallyconstant linear speed.

* * * * *